United States Patent
Hayashi et al.

(10) Patent No.: US 10,078,236 B2
(45) Date of Patent: Sep. 18, 2018

(54) DIMMER AND VIDEO DISPLAY DEVICE USING THE SAME

(71) Applicant: Hitachi-LG Data Storage, Inc., Tokyo (JP)

(72) Inventors: Shingo Hayashi, Tokyo (JP); Satoshi Ouchi, Tokyo (JP); Yoshiho Seo, Tokyo (JP); Tomoto Kawamura, Tokyo (JP); Seiji Murata, Tokyo (JP); Takahiro Matsuda, Tokyo (JP); Toshiteru Nakamura, Tokyo (JP)

(73) Assignee: Hitachi-LG Data Storage, Inc., Tokyo (JP)

(*) Notice: Subject to any disclaimer, the term of this patent is extended or adjusted under 35 U.S.C. 154(b) by 0 days.

(21) Appl. No.: 15/390,822

(22) Filed: Dec. 27, 2016

(65) Prior Publication Data

US 2017/0184894 A1  Jun. 29, 2017

(30) Foreign Application Priority Data

Dec. 28, 2015 (JP) ................. 2015-256512

(51) Int. Cl.
*G02F 1/133* (2006.01)
*G02F 1/137* (2006.01)
(Continued)

(52) U.S. Cl.
CPC ..... *G02F 1/13318* (2013.01); *G02B 27/0172* (2013.01); *G02F 1/137* (2013.01); *G02F 1/163* (2013.01); *H04N 9/3155* (2013.01); *H04N 9/3173* (2013.01); *G02B 26/02* (2013.01); *G02B 2027/0118* (2013.01); *G02F 1/13471* (2013.01); *G02F 1/15* (2013.01); *G02F 1/172* (2013.01); *G02F 2201/44* (2013.01)

(58) Field of Classification Search
CPC ........................................ G02F 1/172
USPC ............ 348/739, 744, 751, 114; 353/97; 345/7.8, 107
See application file for complete search history.

(56) References Cited

U.S. PATENT DOCUMENTS 5,764,316 A * 6/1998 Takizawa ............... F21V 9/10
                                         348/114
6,445,362 B1 * 9/2002 Tegreene ........... G02B 26/0841
                                        345/4

(Continued)

FOREIGN PATENT DOCUMENTS

JP        2012-088472 A    5/2012

*Primary Examiner* — Paulos M Natnael
(74) *Attorney, Agent, or Firm* — Mattingly & Malur, PC

(57) ABSTRACT

There are provided a dimmer that can solve practical problems including burn-in and easily change a transmittance to external light and a video display device using the same. A dimmer includes a stack of two or more light control layers that change a transmittance to incident light by controlling an applied voltage in the incident direction of the incident light. A video display device includes a video generator that generates picture light; a video projector that projects the picture light as a virtual image in the field of view of a user; the dimmer disposed on the opposite side of the projecting side of the video projector to the user for adjusting the light quantity of external light to be entered to a user's eye through the video projector; and a light controller that controls the dimmer suitable for the luminosity of external light detected at an external light detector.

2 Claims, 16 Drawing Sheets

(51) Int. Cl.
  *G02F 1/163* (2006.01)
  *H04N 9/31* (2006.01)
  *G02F 1/1347* (2006.01)
  *G02F 1/15* (2006.01)
  *G02F 1/17* (2006.01)
  *G02B 26/02* (2006.01)
  *G02B 27/01* (2006.01)

(56) References Cited

U.S. PATENT DOCUMENTS

| | | | |
|---|---|---|---|
| 8,952,884 B2* | 2/2015 | Mori | G02F 1/172 |
| | | | 345/107 |
| 2003/0090597 A1* | 5/2003 | Katoh | H04N 9/3111 |
| | | | 348/744 |
| 2004/0263801 A1* | 12/2004 | Totani | G03B 21/2053 |
| | | | 353/97 |
| 2010/0171818 A1* | 7/2010 | Takatori | G09G 3/3655 |
| | | | 348/51 |
| 2013/0314589 A1* | 11/2013 | Takemoto | H04N 5/2254 |
| | | | 348/360 |
| 2014/0340286 A1* | 11/2014 | Machida | G02B 26/0833 |
| | | | 345/8 |
| 2016/0105652 A1* | 4/2016 | Yamashita | G03B 21/2053 |
| | | | 348/333.1 |

* cited by examiner

F I G. 2
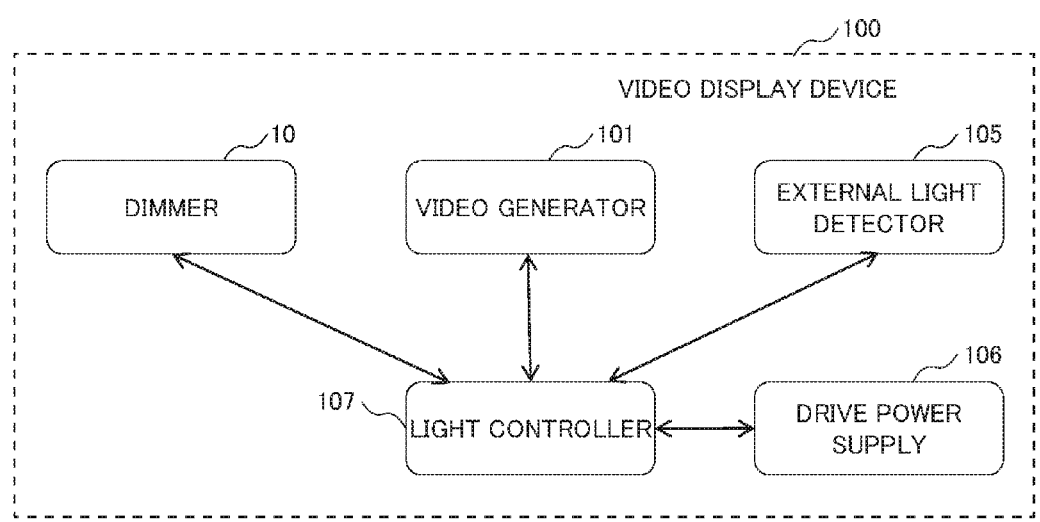

F I G. 4
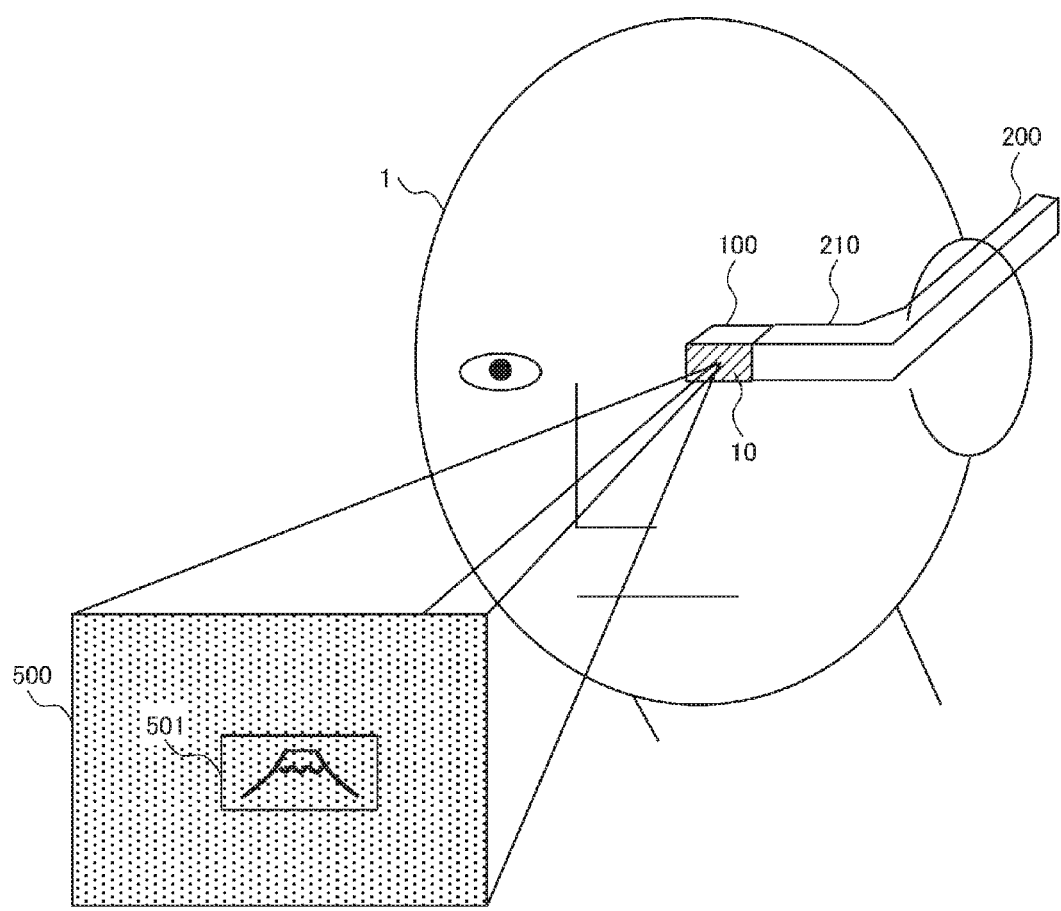

F I G. 7

| LIGHT CONTROL CONDITIONS | CONDITIONS 1 (TRANSLUCENT) | CONDITIONS 2 (1/4 TRANSPARENT) | | CONDITIONS 3 (SHIELDED LIGHT) | |
|---|---|---|---|---|---|
| | | STATE 1 ⟷ STATE 2 | | STATE 3 ⟷ STATE 4 | |
| POLARIZED STATE OF EXTERNAL LIGHT | ↕↔ | ↕↔ | ↕↔ | ↕↔ | ↕↔ |
| POLARIZED STATE AFTER LIGHT IS PASSED THROUGH POLARIZER 26 | ↔ | ↔ | ↔ | ↔ | ↔ |
| DRIVE CONDITIONS FOR LIQUID CRYSTAL LAYER — FIRST LIQUID CRYSTAL LAYER 21 — APPLIED VOLTAGE: V1 | V1=0 | V1=A | V1=0 | V1=B | V1=0 |
| IMPARTED PHASE | 1/2 λ | 1/4 λ | 1/2 λ | 0 λ | 1/2 λ |
| POLARIZED STATE | ↕ | ◯ | ↕ | ↔ | ↕ |
| SECOND LIQUID CRYSTAL LAYER 22 — APPLIED VOLTAGE: V2 | V2=0 | V2=0 | V2=A | V2=0 | V2=B |
| IMPARTED PHASE | 1/2 λ | 1/2 λ | 1/4 λ | 1/2 λ | 0 λ |
| POLARIZED STATE | ↔ | ◯ | ◯ | ↕ | ↕ |
| POLARIZED STATE AFTER LIGHT IS PASSED THROUGH REFLECTIVE FILM 103a | ↔ | ↔ | ↔ | — | — |
| TRANSMITTANCE | 50% | 25% | | 0% | |

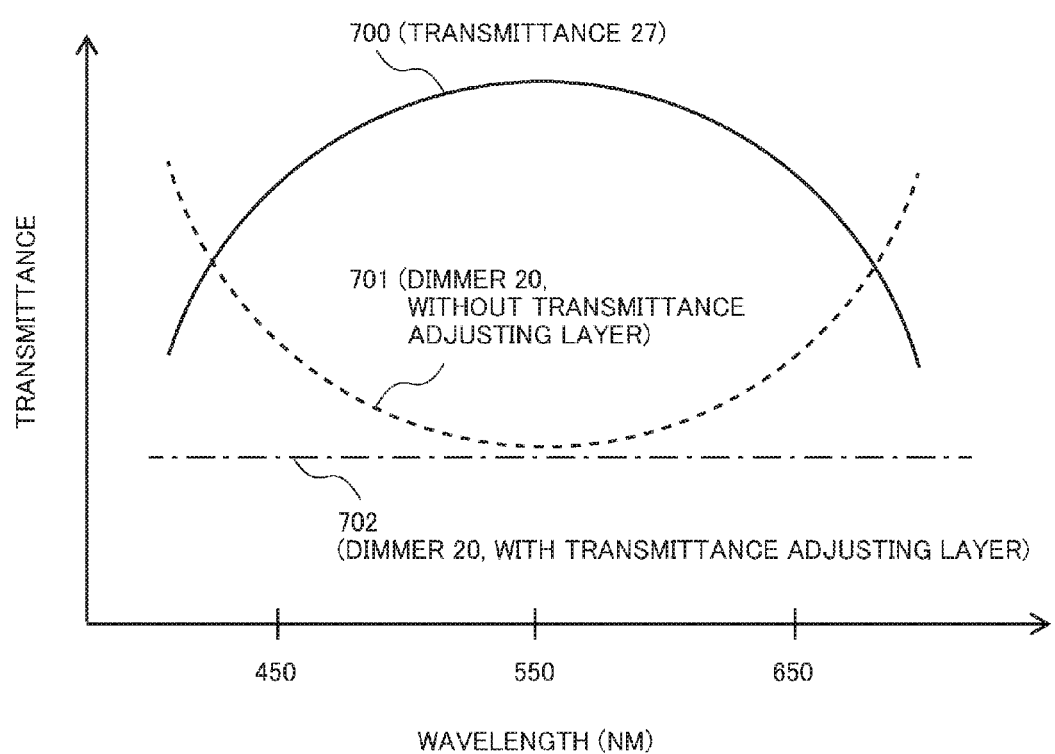
F I G. 8

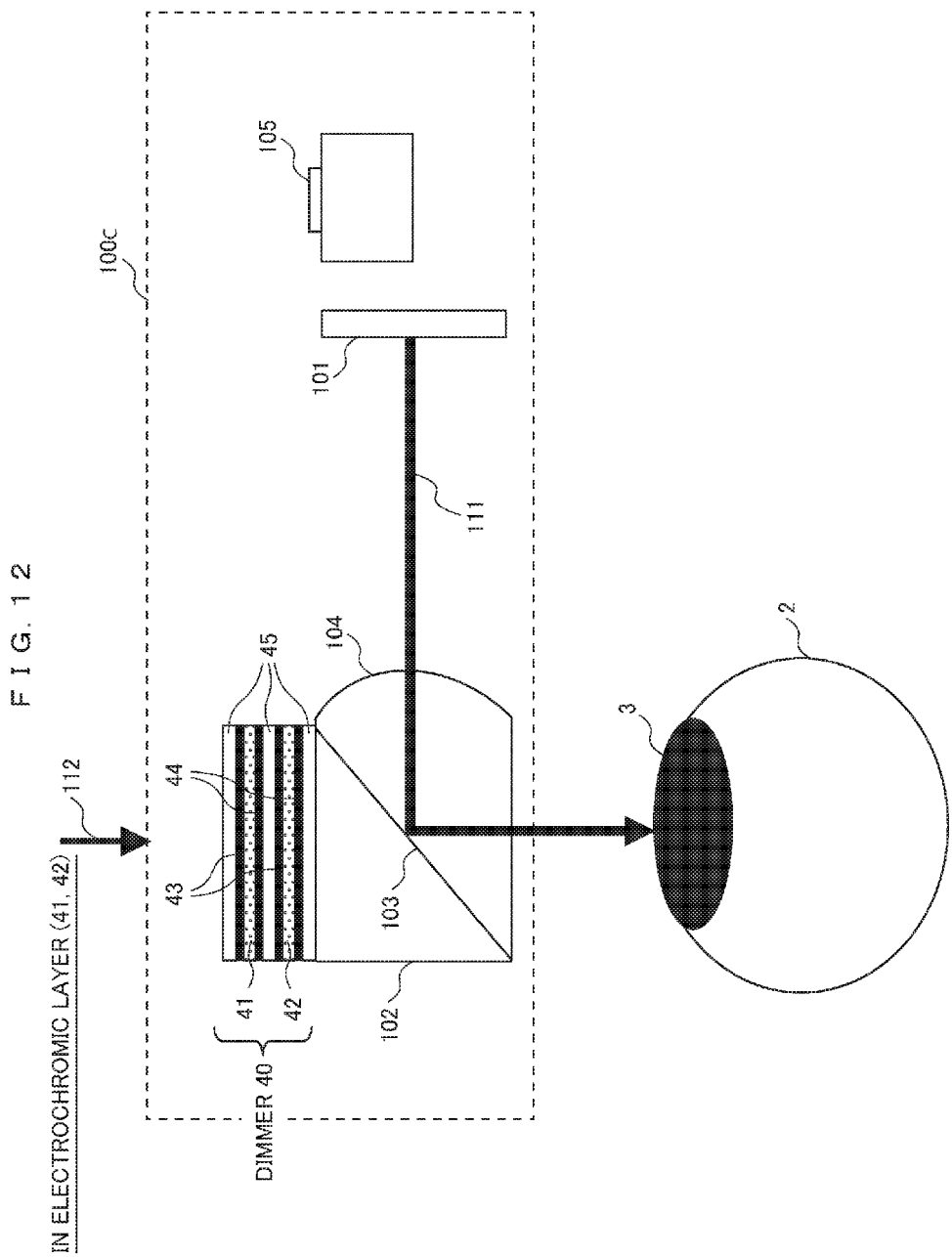

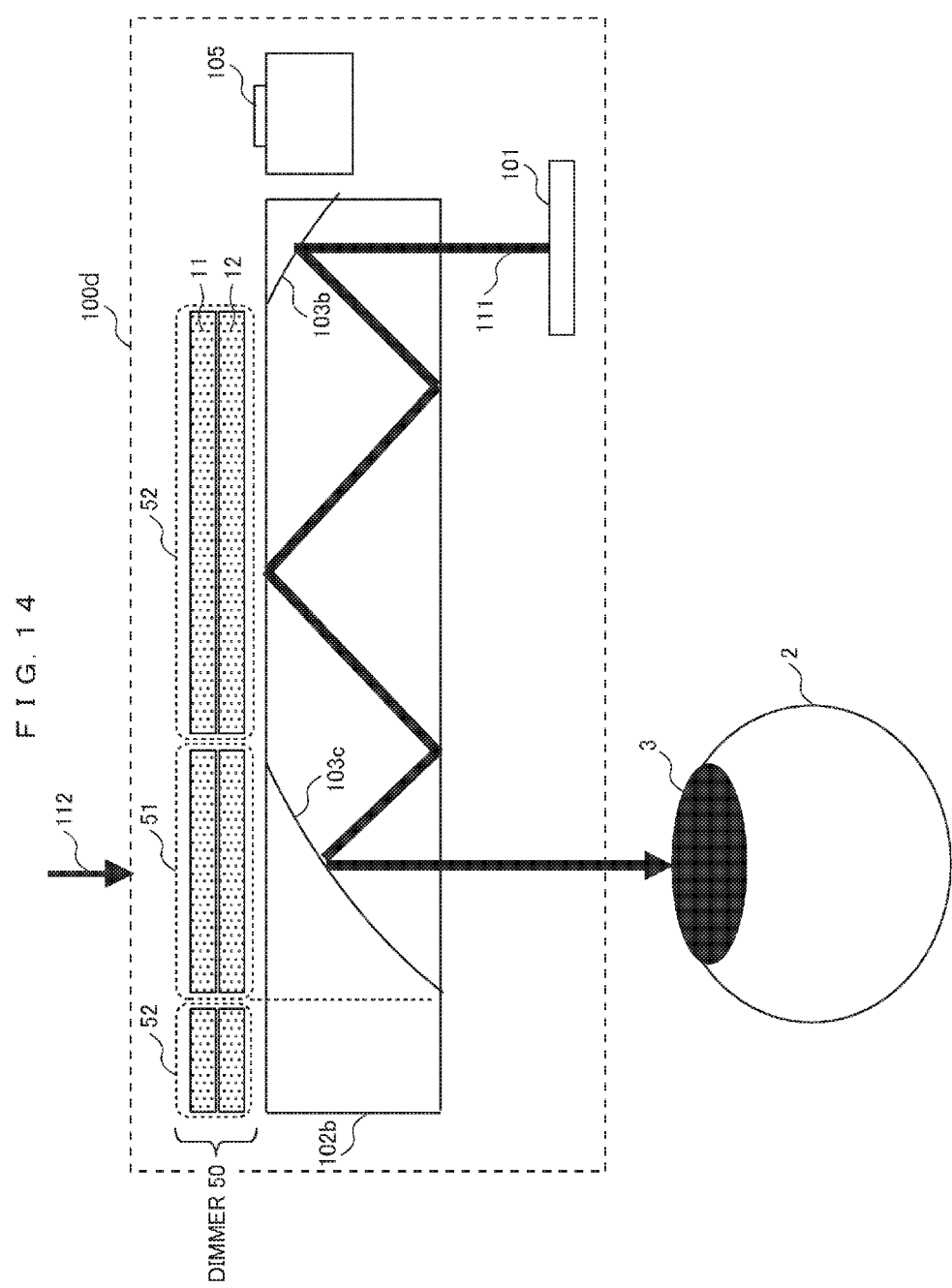

DIMMER AND VIDEO DISPLAY DEVICE USING THE SAME

CLAIM OF PRIORITY

The present application claims priority from Japanese patent application serial No. JP 2015-256512, filed on Dec. 28, 2015, the content of which is hereby incorporated by reference in to this application.

BACKGROUND OF THE INVENTION (1) Filed of the Invention

The present invention relates to a dimmer that controls the luminosity of external light reaching human eyes and a video display device using the same.

(2) Description of the Related Art

There are known video display devices that present display of predetermined pictures to a user using virtual images. These devices are commercially available as head mounted displays or head-up displays. In such video display devices, various configurations of optical systems are proposed so as to observe displayed pictures and surroundings at the same time. For example, Japanese Patent Application Laid-Open No. 2012-88472 describes a virtual image display device in which in order to allow surroundings to be observed and to prevent external light from interfering with the observation of pictures, a dimming plate is disposed opposed to the surroundings side of a light guide plate to adjust the transmission state of external light.

SUMMARY OF THE INVENTION

In order to simultaneously observe pictures and surroundings through a video display device using virtual images, it is necessary to change the transmission state (the transmittance) between the case in which the surroundings are bright and the case in which the surroundings are dark. In other words, in the case in which the surroundings are bright, the transmittance of external light is decreased, because pictures relatively look dark. Conversely, in the case in which the surroundings are dark, the transmittance of external light is increased in order to visually clearly recognize the surroundings.

Japanese Patent Application Laid-Open No. 2012-88472 discloses the virtual image display device including the dimming plate that adjusts the transmittance of external light. Examples of optical devices for use in the virtual image display device include a liquid crystal panel, an electrochromic device, a transmission voltage device, and other devices.

However, when these optical devices are used in video display devices, such as a head mounted display, practical problems arise. For example, the liquid crystal panel has a problem of a burn-in phenomenon in the case in which a constant voltage is continuously applied. The electrochromic device has a problem of a decreased response speed due to the device thickness. The transmission voltage device has a problem of the necessity of high voltage driving, and other problems. Japanese Patent Application Lad-Open No. 2012-88472 does not take into account of these problems.

In view of the problems above, an object of the present invention is to provide a dimmer that can address practical problems, such as burn-in, and can easily change a transmittance to external light and a video display device using the same.

A first aspect of the present invention is a dimmer that adjusts a transmittance of incident light including: a light control layer that changes a transmittance of light at wavelengths in a visible light region by controlling an applied voltage; and an electrode that applies a voltage to the light control layer. In the dimmer, two or more of the light control layers are stacked in an incident direction of the incident light.

A second aspect of the present invention is a video display device that displays pictures in a field of view of a user, the video display device including: a video generator that generates picture light; a video projector that projects the picture light generated at the video generator in the field of view of the user as a virtual image; a dimmer disposed on an opposite side of the video projector to project the picture light to the user, the dimmer adjusting a light quantity of external light to be entered to a user's eye; an external light detector that detects luminosity of the external light; and a light controller that controls the dimmer suitable for the luminosity of the external light detected at the external light detector. In the video display device, the dimmer has a configuration in which two or more light control layers are stacked in an incident direction of the external light, the light control layer changing a transmittance of light at wavelengths in a visible light region by controlling an applied voltage.

According to the aspects of the present invention, there can be provided a dimmer that can solve practical problems, such as burn-in on the light control layer and can easily change a transmittance to external light and a video display device using the same.

BRIEF DESCRIPTION OF THE DRAWINGS

FIG. 2 is a block diagram of the configuration of the video display device;

FIG. 4 is a schematic diagram of the appearance of a head mounted display installed with the video display device;

FIG. 7 is a diagram of the light control operation of the dimmer;

FIG. 8 is a diagram of the transmittance properties of a transmittance adjusting layer;

FIG. 12 is a top view of the configuration of a video display device using electrochromic layers in a dimmer (a fourth embodiment);

FIG. 14 is a top view of the configuration of a video display device that can control light in a part of the field of view (a fifth embodiment);

DETAILED DESCRIPTION OF THE PREFERRED EMBODIMENTS

Figure 1:
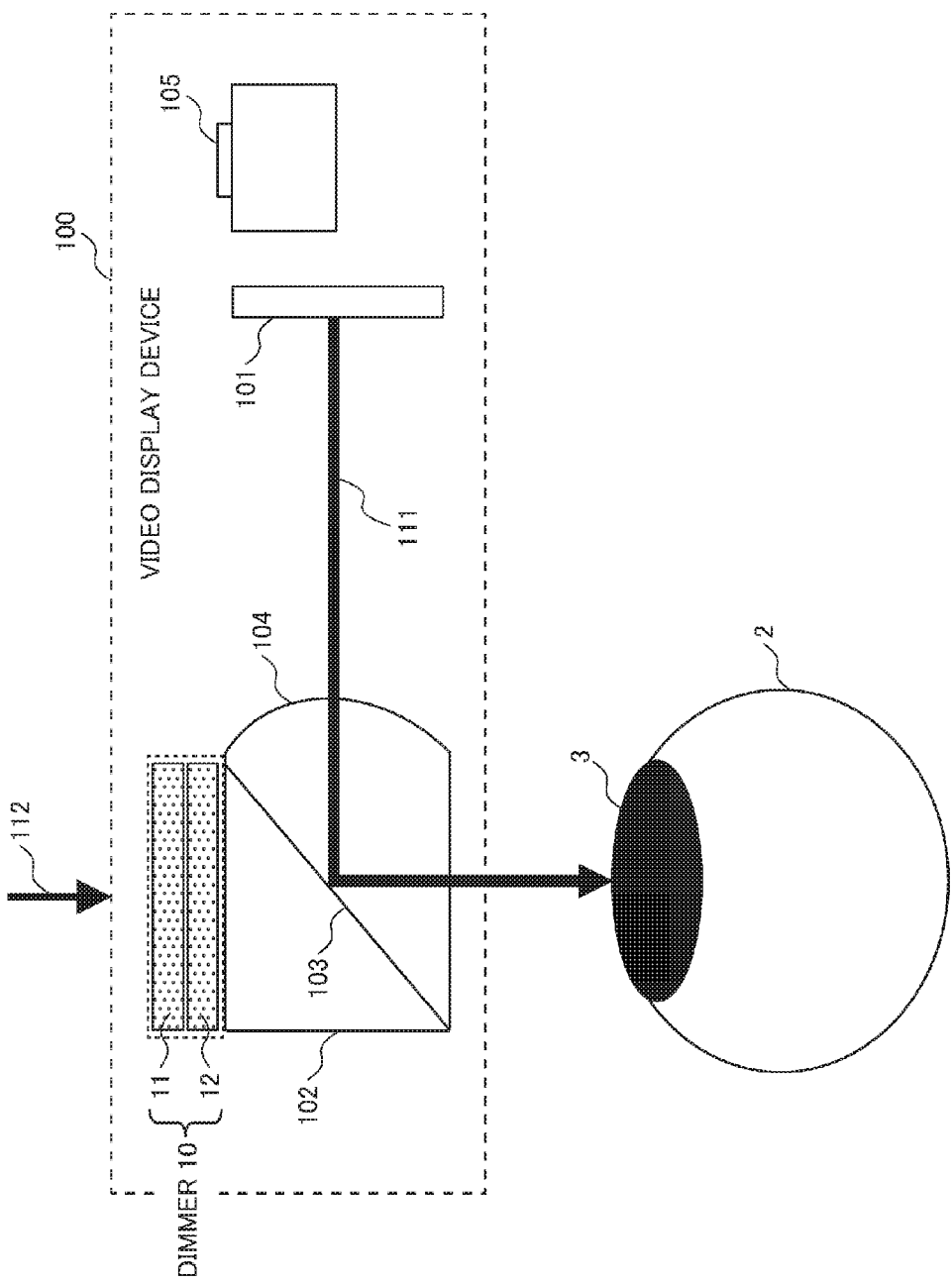
FIG. 1 is a top view of the basic configuration of a video display device having a dimmer (a first embodiment)

In the following, embodiments of the present invention will be described with reference to the drawings. In the following, description will be made based on examples in which a dimmer and a video display device are applied to a head mounted display. However, the present invention is not limited to these examples. In the drawings, components having similar functions are designated the same reference numerals and signs.

First Embodiment

In a first embodiment, the basic configurations of a dimmer and a video display device using the same will be described.

FIG. 1 is a top view of the basic configuration of a video display device 100 having a dimmer. The video display device 100 includes a video generator 101, a video projector 102, an external light detector 105, and a dimmer 10 that adjusts external light. A user's eye 2 can simultaneously observe both of picture light 111 from the video display device 100 and external light 112.

The video generator 101 includes a video display device (e.g. a transmissive or reflective liquid crystal panel or a digital mirror device) that generates pictures and an illumination optical system (e.g. an LED backlight or an optical system configured of an LED and a lens) that applies light to the video display device. The picture light 111 emitted from the video generator 101 is entered to the video projector 102.

The video projector 102 is configured of a reflective film 103 and a lens face 104. The picture light 111 entered to the video projector 102 is transmitted through the lens face 104, reflected off the reflective film 103, and projected to a pupil 3 of the user's eye 2. In this process, the lens face 104 has a lens function that causes the user's eye 2 to visually recognize pictures generated at the video generator 101 as virtual images. Here, the reflective film 103 has a beam splitting function that reflects a part of the picture light 111 and transmits another part. This is a function that simultaneously guides the external light 112 transmitted through the dimmer 10 to the user's eye 2. The reflective film 103 may have a function of a half mirror having 50% of transmittance and 50% of reflectance, or may have a function of a polarizing beam splitter using the polarization properties of light.

The dimmer 10 has a two-layer structure of a first light control layer 11 and a second light control layer 12. The dimmer 10 is disposed on the opposite side of the video projector 102 when viewed from the user's eye 2. The dimmer 10 has a function that changes the transmittance to the external light 112 for adjusting the light quantity of the external light 112 to be entered to the user's eye 2. For the material of the dimmer 10, i.e. the materials of the first and the second light control layers 11 and 12, a liquid crystal device, a suspended particle device, an electrochromic device, and other devices are used as an optical device having a variable transmittance to light at wavelengths in a visible light region. These are devices that change the transmittance by controlling a voltage to be applied.

The external light detector 105 has a function that detects the luminosity of the external light 112, for which an illuminance sensor, a camera, and other devices are used. Information about the luminosity of the external light 112 detected at the external light detector 105 is used for controlling the dimmer 10 and the video generator 101.

In the case in which two liquid crystal layers, for example, are used as the first and the second light control layers 11 and 12 of the dimmer 10 here, the liquid crystal layers to be driven can be used being alternately switched. Thus, a continuous application of a constant voltage to a light control layer in a one-layer structure is eliminated, and hence the effect of preventing burn-in on the liquid crystal layer can be obtained, which is a problem when only one light control layer is provided.

In the case in which a suspended particle device is used for the light control layer, a two-layer structure is provided to decrease the levels of voltages applied to the suspended particle device layers, allowing the adjustment of a desired transmittance with much lower applied voltages.

In the case in which an electrochromic device is used for the light control layer, a two-layer structure is provided to improve the response speed of the electrochromic layers, allowing the transmittance to be compatible with the response speed.

As described above, the dimmer 10 is formed of a stack of two light control layers. Thus, a dimmer can be implemented in which the transmittance to external light is appropriately changed suitable for the luminosity of external light with practical problems, such as burn-in, applied voltages, and response speed, being avoided. Here, the configuration is described in which the dimmer 10 includes two light control layers. However, it is without saying that even a multi-layer configuration of three or more layers also provides a similar effect. Note that, the properties of the optical devices used for the light control layer will be described in detail in second to fourth embodiments described later.

FIG. 2 is a block diagram of the configuration of the video display device 100. The video display device 100 is configured of the dimmer 10, the video generator 101, the external light detector 105, a drive power supply 106, and a light controller 107. In these components, the dimmer 10, the video generator 101, and the external light detector 105 are as described with reference to FIG. 1.

The light controller 107 controls the transmittance of the dimmer 10 and the intensity of the picture light generated at the video generator 101 suitable for the luminosity of the external light 112 detected at the external light detector 105. Specifically, the light controller 107 switches the drive conditions (applied voltages) for the first and the second light control layers 11 and 12 of the dimmer 10. The drive power supply 106 supplies electric power to the dimmer 10 and the video generator 101 through the light controller 107.

For example, the case will be described in which the video display device 100 is used in the environment in which the user is in bright ambient light. In the bright environment, strong external light 112 is superposed on the picture light 111. Thus, the contrast of pictures is reduced, and the user hardly visually recognizes pictures. In this case, the light controller 107 controls the dimmer 10 to decrease the transmittance of the dimmer 10 for reducing the light quantity of external light and the video generator 101 to increase the intensity of the picture light, which the video generator 101 generates. As a result, the contrast of pictures is improved, and the user easily visually recognizes pictures. As described above, the video display device 100 has functions that maintain necessary contrast of pictures even though the luminosity of the ambient environment is changed.

Figure 3:
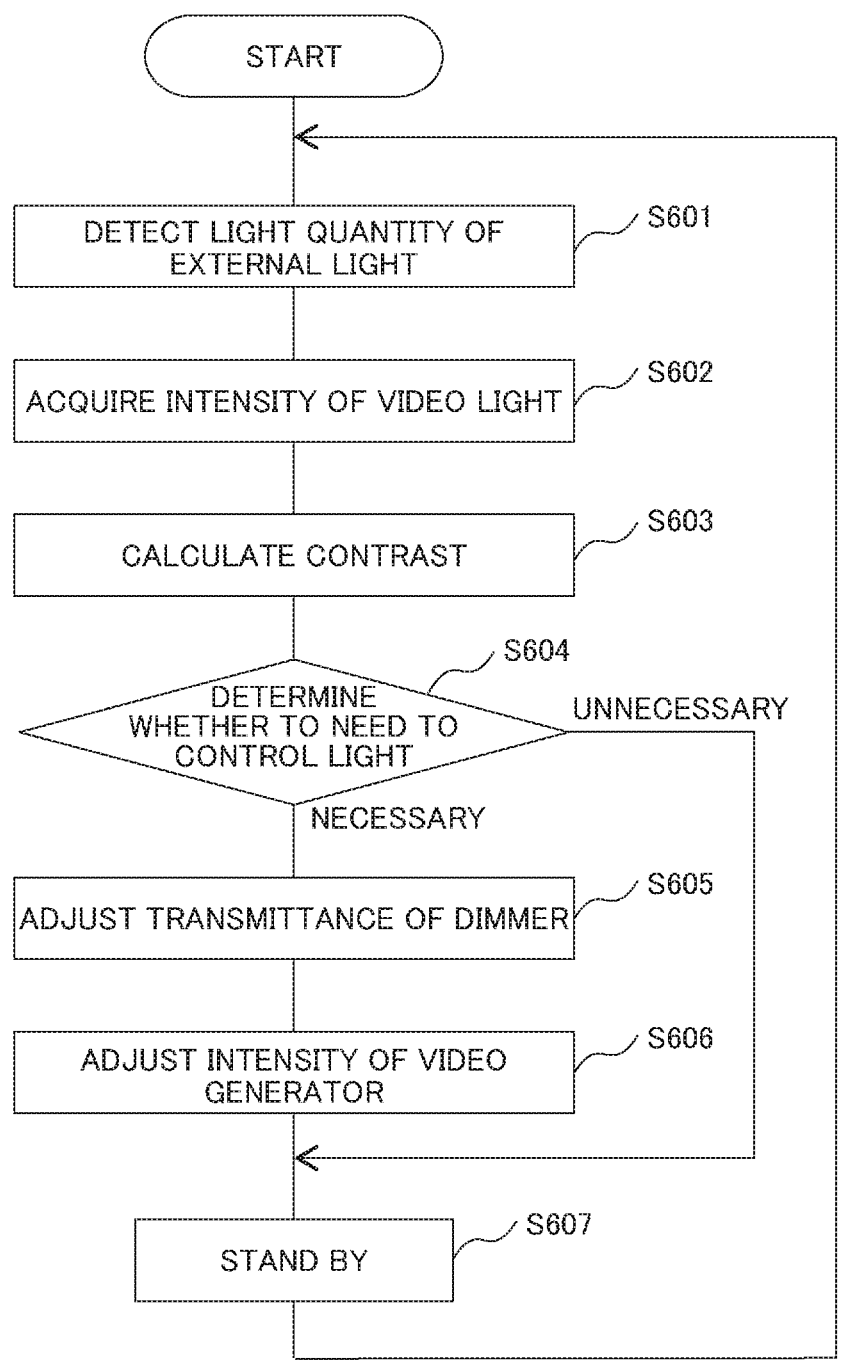
FIG. 3 is a flowchart of controlling light performed by a light controller.

FIG. 3 is a flowchart of controlling light performed by the light controller 107. The light controller 107 repeatedly performs a flow below at a predetermined time interval while the video display device 100 is operating.

In Step S601, the light controller 107 detects the luminosity of the external light 112 (a light quantity) from the external light detector 105. In Step S602, the light controller 107 acquires the intensity of the picture light 111 to be generated at the video generator 101. For example, the light controller 107 acquires the maximum luminance level or the average luminance level of picture signals. In Step S603, the light controller 107 compares the intensity level of the picture light 111 with the intensity level of the external light 112 to calculate the contrast of pictures. In the case in which the dimmer 10 is already in the dimming state (e.g. in a state in which the transmittance is decreased), the light controller 107 calculates the contrast of pictures to be entered to the user's eye with the dimming state being taken into account.

In Step S604, the light controller 107 determines whether the calculated contrast of pictures is in a predetermined range, i.e. the light controller 107 determines whether the dimming state has to be adjusted in order to maintain a predetermined contrast. In the case in which light control (adjustment) is necessary, the process goes to Step S605, whereas in the case in which light control (adjustment) is unnecessary, the process goes to Step S607.

In Step S605, the light controller 107 adjusts the transmittance of the dimmer 10. For example, the light controller 107 adjusts light in such a manner that in the case in which the luminosity of external light is large, the transmittance is decreased, whereas in the case in which the luminosity of external light is small, the transmittance is increased. In Step S606, the light controller 107 adjusts the intensity of the picture light generated at the video generator 101. For example, the light controller 107 adjusts light in such a manner that in the case in which the luminosity of external light is large, the intensity of the picture light is increased, whereas in the case in which the luminosity of external light is small, the intensity of the picture light is decreased.

In Step S607, the light controller 107 waits for a predetermined time period for the preparation for a change in the ambient environment of the user. After a predetermined time period, the process returns to Step S601, and the light controller 107 repeats the flow. By the light control operation described above, the user can continuously observe pictures at a predetermined contrast.

Note that, control of the dimmer 10 in Step S605 and control of the video generator 101 in Step S606 are in a complementary relationship. An appropriate selection only has to be made whether to use one or both of the dimmer 10 and the video generator 101. For example, a configuration may be possible in which the dimmer 10 is mainly controlled, and the video generator 101 is additionally controlled when a desired contrast is not achieved only with control of the dimmer 10.

Next, a head mounted display installed with the video display device 100 will be described.

FIG. 4 is a schematic diagram of the appearance of a head mounted display 200 installed with the video display device 100. The head mounted display 200 has a configuration in which the video display device 100 is installed on a temple-like arm 210. The arm 210 is mounted on the head of a user 1, and the arm 210 is disposed to oppose the video display device 100 to the eye of the user 1 (in this example, the left eye).

The user 1 can visually recognize a virtual image generated by the video display device 100 in a picture display area 501 inside a region 500 of the entire field of view. To the eye of the user 1, external light is entered through the dimmer 10 of the video display device 100. In the entrance of external light, the transmittance of the dimmer 10 is changed, allowing the user to simultaneously visually recognize pictures and the surroundings with the luminosity of external light being adjusted.

Figure 5:
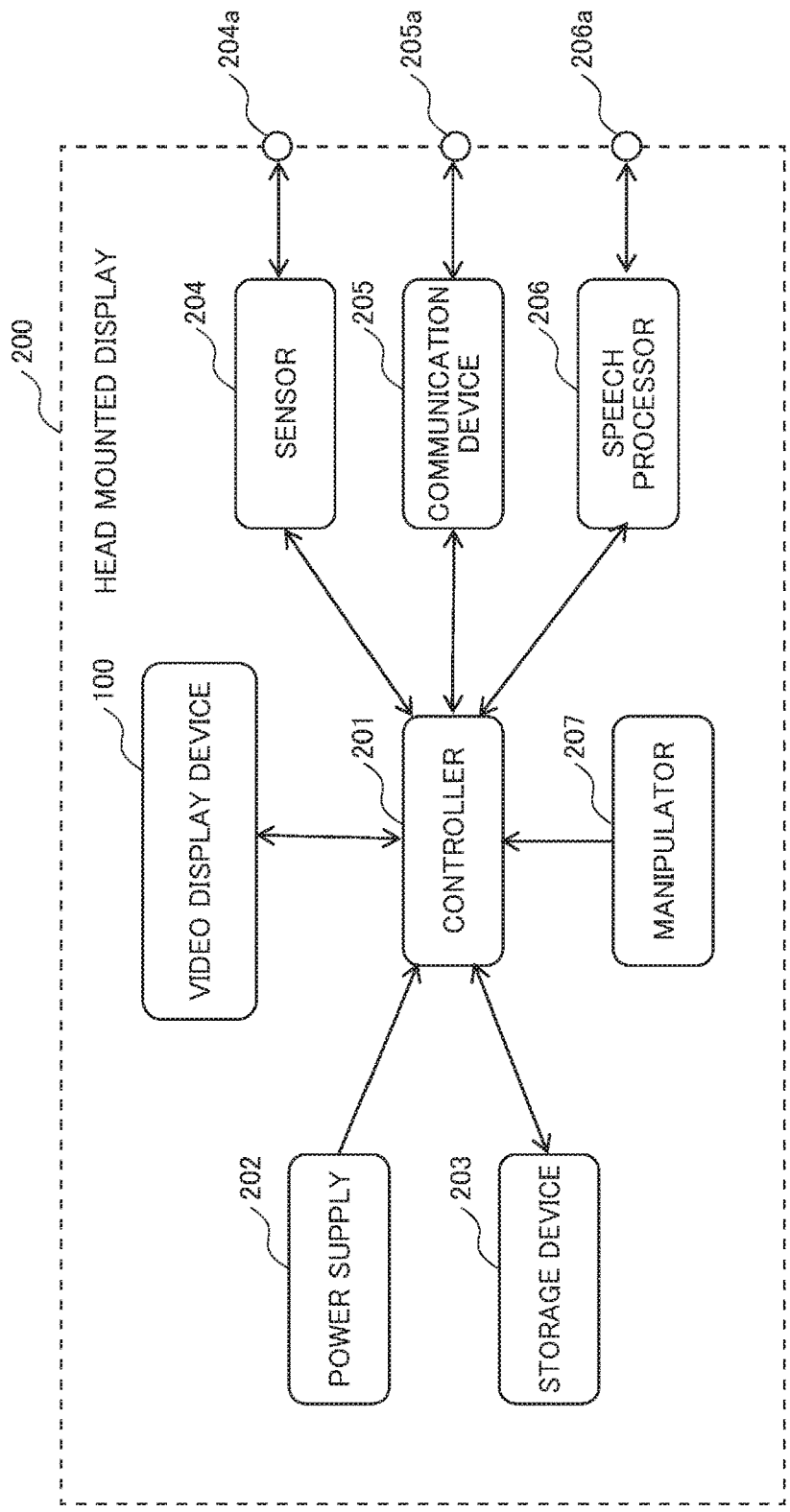
FIG. 5 is a diagram of the block configuration of the head mounted display.

FIG. 5 is a diagram of the block configuration of the head mounted display 200. The head mounted display 200 includes a controller 201, a power supply 202, a storage device 203, a sensor 204, a communication device 205, a speech processor 206, and a manipulator 207, together with the video display device 100. A sensor input/output terminal 204a, a communication input/output terminal 205a, and a voice input/output terminal 206a are terminals connected to external devices. These components are housed in the arm 210 in FIG. 4.

The controller 201 controls the entire head mounted display 200. The power supply 202 supplies power to the video display device 100 using batteries, for example. Note that, the power supply 202 may also serve as the drive power supply 106 in FIG. 2. The storage device 203 is a device that stores information, for which a semiconductor memory, a small-sized hard disk drive, or the like is used.

The sensor 204 is connected to an external sensor through the sensor input/output terminal 204a, and detects various items of information. The sensor 204 can detect, for example, the postures, orientation, and motion of the user using a slope sensor, an acceleration sensor, and other sensors, the physical conditions of the user using a sight line sensor, a temperature sensor, and other sensors, the present location of the user using a GPS sensor, the instruction input of the user using a pressure sensitive sensor, an electrostatic capacitance sensor, and other sensors, or the state of the user wearing or not wearing the head mounted display 200 using a proximity sensor. The sensor 204 may have a plurality of the above functions.

The communication device 205 communicates with an external network through the communication input/output terminal 205a in a wireless manner or with cables. Thus, for example, the head mounted display 200 can directly acquire information via communications with the base station of the Internet. The speech processor 206 is connected to a microphone or earphones through the voice input/output terminal 206a for processing audio signals. The manipulator 207 receives manipulations from the user.

Note that, arrows in FIG. 5 express control directions and transmission directions of information. However, these arrows do not express all the control lines or all the information lines. The sensor 204 and the speech processor 206 may be configured to include external devices themselves (an external sensor, a microphone, and other devices).

As described above, according to the first embodiment, with the use of the dimmer 10 including two or more light control layers, a necessary contrast of pictures can be maintained regardless of the luminosity of the ambient environment, and the video display device 100 of excellent practical usability and the head mounted display 200 installed with the same can be implemented.

In embodiments below, specific configurations of the dimmer will be described in detail.

Second Embodiment

In a second embodiment, the case will be described in which liquid crystal layers are used for the light control layer of a dimmer.

Figure 6:
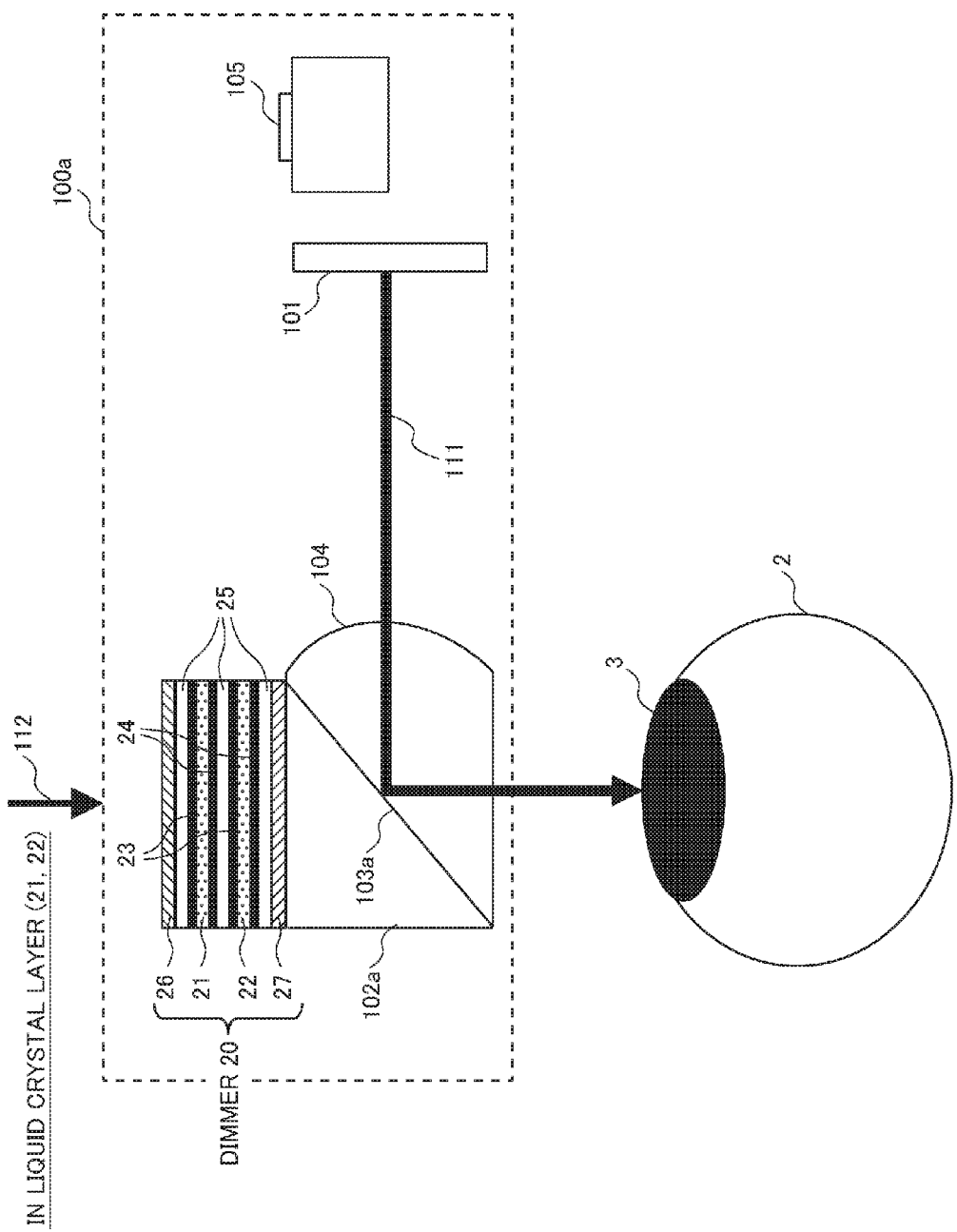
FIG. 6 is a top view of the configuration of a video display device using liquid crystal layers in a dimmer (a second embodiment)

FIG. 6 is a top view of the configuration of a video display device using liquid crystal layers for a dimmer. Components having functions the same as the functions in the first embodiment (FIG. 1) are designated the same reference numerals and signs, and the description is omitted. In a video display device 100a, a dimmer 20 is configured in a combination of two liquid crystal layers, a first liquid crystal layer 21 and a second liquid crystal layer 22, and a polarizer 26. In a video projector 102a, a reflective film 103a has a function of a polarizing beam splitter that separates polarized light. The configuration of the dimmer 20 will be ascribed in detail.

The dimmer 20 is configured of the first liquid crystal layer 21, the second liquid crystal layer 22, two positive transparent electrodes 23, two negative transparent electrodes 24, three transparent substrates 25, the polarizer 26, and a transmittance adjusting layer 27.

These are stacked, from the incidence side of external light 112, in order of the polarizer 26, the transparent substrate 25, the positive transparent electrode 23, the first liquid crystal layer 21, the negative transparent electrode 24, the transparent substrate 25, the positive transparent electrode 23, the second liquid crystal layer 22, the negative transparent electrode 24, the transparent substrate 25, and the transmittance adjusting layer 27.

The polarizer 26 selects only polarized light in a predetermined direction from the external light 112, which is randomly polarized light. The first and the second liquid crystal layers 21 and 22 are layers sealed with liquid crystal that change phases to be imparted to light by applying voltages. In the second liquid crystal layer 22, the direction of a phase to be imparted is orthogonal to the first liquid crystal layer 21.

The positive transparent electrode 23 and the negative transparent electrode 24 are electrodes that apply voltages to the first and the second liquid crystal layers 21 and 22, and control the first and the second liquid crystal layers 21 and 22 to impart phases to incident light by controlling applied voltages. The transparent substrate 25 is an optically transparent substrate, and reinforces the strength, which is short in the first and the second liquid crystal layers 21 and 22.

The transmittance adjusting layer 27 has a filter function in which transmittance properties are different depending on wavelengths. Thus, the wavelength dependence on the transmittance of the first and the second liquid crystal layers 21 and 22 can be corrected.

According to the configuration above, the polarization direction of the external light 112 is selected by the polarizer 26, and the applied voltages to two liquid crystal layers 21 and 22 are controlled, allowing a change in the phases of light that is transmitted through the two liquid crystal layers 21 and 22. Lastly, the polarization direction is selected by the reflective film 103a. Consequently, the light quantity of the external light 112 transmitted through the dimmer 20 can be adjusted. Moreover, in the embodiment, two liquid crystal layers 21 and 22 are alternately driven, allowing the burn-in phenomenon of the liquid crystal layers to be prevented. In the following, this will be described more in detail.

FIG. 7 is a diagram of the light control operation of the dimmer 20. Here, for simplicity, three typical light control conditions will be described. In conditions 1, the dimmer 20 is translucent to light (a transmittance of 50%). In conditions 2, the dimmer 20 is quarter transparent to light (a transmittance of 25%). In conditions 3, the dimmer 20 shields light (a transmittance of 0%). The other intermediate conditions (transmittances of 50 to 0%) are also achievable by adjusting applied voltages. Note that, since the transmittance adjusting layer 27 will be described later, here, the description will be made except the function of the transmittance adjusting layer 27.

Conditions 1

In order to achieve the dimmer 20 being translucent to light (a transmittance of 50%), no voltages are applied to the first and the second liquid crystal layers 21 and 22 (V1=V2=0). Since the polarized state of external light is a random polarized state as described above, the light components are sorted into vertical and horizontal components in FIG. 7. The external light is transmitted, from the incident side, through the polarizer 26, the first liquid crystal layer 21, the second liquid crystal layer 22, and the reflective film 103a, and is reached to the user's eye.

First, after external light is transmitted through the polarizer 26, a polarization component in a predetermined direction (here, in the vertical direction in FIG. 7) is selected. At this point in time, the light quantity is a half. Subsequently, the light is entered to the first liquid crystal layer 21. Since no voltage is applied to the liquid crystal layer 21 (V1=0), the liquid crystal layer 21 has a so-called half-wave plate function. Thus, the polarized state of the light is converted into light polarized in the direction orthogonal at an angle of 90 degrees (in the lateral direction in FIG. 7).

Subsequently, the light is entered to the second liquid crystal layer 22. Since no voltage is applied to the liquid crystal layer 22 as well (V2=0), the liquid crystal layer 22 has a so-called half-wave plate function. Thus, the polarized state of the light is converted into light polarized in the direction orthogonal at an angle of 90 degrees (in the vertical direction in FIG. 7).

Lastly, the light is entered to the reflective film 103a. The reflective film 103a is a polarizing beam splitter using the polarization properties of light, and is assumed to have the same polarization selection properties as those of the polarizer 26. In other words, the reflective film 103a transmits polarized light in a predetermined direction (in the vertical direction in FIG. 7), and reflects polarized light orthogonal to that polarized light (in the lateral direction in FIG. 7). Thus, the light is transmitted through the reflective film 103a as it is. As a result, in conditions 1, light is reached to the user's eye by 50%.

Conditions 2

In order to achieve the dimmer 20 being quarter transparent to light (a transmittance of 25%), voltages are alternately applied to the first and the second liquid crystal layers 21 and 22. The voltage to be applied is a voltage (=A), which imparts a phase corresponding to a quarter wave plate. State 1 shows the case in which a voltage (V1=A) is applied to the first liquid crystal layer 21. State 2 shows the case in which a voltage (V2=A) is applied to the second liquid crystal layer 22.

State 1 will be described. The light whose quantity is decreased to a half at the polarizer 26 is entered to the first liquid crystal layer 21, and converted into circularly polarized light at the liquid crystal layer 21. This is because the liquid crystal layer 21 has a quarter-wave plate function due to the application of a voltage (V1=A). Subsequently, the light is entered to the second liquid crystal layer 22. Since no voltage is applied to the liquid crystal layer 22 (V2=0), the liquid crystal layer 22 has a half-wave plate function. Thus, the polarized state of the light is converted into circularly polarized light whose rotation direction is inverted.

Lastly, the light is entered to the reflective film 103a. The circularly polarized light includes polarization components in the lateral direction and the vertical direction. Thus, the reflective film 103a transmits polarized light in a predetermined direction (in the vertical direction in FIG. 7), and reflects polarized light orthogonal to that polarized light (in the lateral direction in FIG. 7). In other words, the light quantity is decreased to a half at the reflective film 103a. As a result, in state 1, light is reached to the user's eye by 25% in total.

State 2 will be described. The light whose light quantity is decreased to a half at the polarizer 26 is entered to the first liquid crystal layer 21. Since no voltage is applied to the liquid crystal layer 21 (V1=0), the polarized state of the light is converted into light polarized in the direction orthogonal at an angle of 90 degrees (in the lateral direction in FIG. 7). Subsequently, the light is entered to the second liquid crystal layer 22. Since a voltage (V2=A) is applied to the liquid crystal layer 22, the light is converted into circularly polarized light.

Lastly, the light that is circularly polarized light is entered to the reflective film 103a, and then the light quantity is decreased to a half at the reflective film 103a. As a result, similarly in state 1, in state 2, the light is reached to the user's eye by 25% in total.

As described above, both in states 1 and 2, the conditions for the dimmer 20 being quarter transparent to light (a transmittance of 25%) is achieved. Therefore, in conditions 2, states 1 and 2 are alternately switched. In other words, the voltage A is alternately applied to the first and the second liquid crystal layers 21 and 22 for driving them.

Also in the case in which conditions 3 for the dimmer 20 shielding light is achieved (a transmittance of 0%), a voltage is alternately applied to the first and the second liquid crystal layers 21 and 22. The voltage to be applied is a voltage (=B) that imparts no phase. State 3 shows the case in which a voltage (V1=B) is applied to the first liquid crystal layer 21. State 4 shows the case in which a voltage (V2=B) is applied to the second liquid crystal layer 22.

State 3 will be described. The light whose light quantity is decreased to a half at the polarizer 26 is entered to the first liquid crystal layer 21. Since a voltage (V1=B) is applied to the liquid crystal layer 21 and the phase to be imparted is zero (0λ), the light is transmitted through the liquid crystal layer 21 as it is. Subsequently, the light is entered to the second liquid crystal layer 22. Since no voltage is applied to the liquid crystal layer 22 (V2=0), a half wave phase is imparted to the light, and the polarized state of the light is converted into light polarized in the direction orthogonal at an angle of 90 degrees (in the lateral direction in FIG. 7).

Lastly, the light is entered to the reflective film 103a. At this time, the entire light quantity of the light is reflected off the reflective film 103a. As a result, the total transmittance is 0%, and no light is reached to the user's eye.

State 4 will be described. The light whose light quantity is decreased to a half at the polarizer 26 is entered to the first liquid crystal layer 21. Since no voltage is applied to the liquid crystal layer 21 (V1=0), a half wave phase is imparted to the light, and the light is converted into the polarized light in the direction orthogonal at an angle of 90 degrees (in the lateral direction in FIG. 7) by the liquid crystal layer 21. Subsequently, the light is entered to the second liquid crystal layer 22. Since a voltage (V2=B) is applied to the liquid crystal layer 22 and the phase to be imparted is zero (0λ), the light is transmitted through the second liquid crystal layer 22 as it is.

Lastly, the light is entered to the reflective film 103a. Similarly in state 3, the entire light quantity is reflected off the reflective film. As a result, similarly in state 3, the total transmittance is 0%, and no light is reached to the user's eye.

As described above, in both of states 3 and 4, the conditions shielded light (a transmittance of 0%) is implemented. Therefore, under conditions 3, states 3 and 4 are alternately switched. In other words, the voltage B is alternately applied to the first and the second liquid crystal layers 21 and 22 for driving them.

As described above, the applied voltages to the first and the second liquid crystal layers 21 and 22 are controlled. Thus, the transmittance of the external light can be freely controlled in a range of 0 to 50%. However, in previously existing driving methods for a liquid crystal layer, the liquid crystal layer is used with the voltage to be applied being greatly changed. This is because when a constant voltage causes burn-in on the liquid crystal layer, this causes the liquid crystal layer in no operation. In the dimmer 20 according to the embodiment, it is necessary to maintain a predetermined transmittance for a long time. Thus, as described above, two liquid crystal layers are alternately operated, and hence the effect of preventing burn-in is easily obtained. Here, the configuration is described in which the dimmer 20 includes two liquid crystal layers. However, it is without saying that even a multi-layer configuration of three or more layers also provides a similar effect.

Next, the function of the transmittance adjusting layer 27 will be described. The transmittance adjusting layer 27 is a layer that uniformly corrects the light quantity of external light to be transmitted through the dimmer 20 regardless of wavelengths.

FIG. 8 is a diagram of the transmittance properties of the transmittance adjusting layer 27. The horizontal axis expresses the wavelength, and the vertical axis expresses the transmittance. A solid line 700 shows the transmittance properties of the transmittance adjusting layer 27. A broken line 701 shows the transmittance properties of the dimmer 20 in the case in which no transmittance adjusting layer 27 is provided (i.e. only the liquid crystal layers 21 and 22 are provided). An alternate long and short dash line 702 shows the transmittance properties of the dimmer 20 provided with the transmittance adjusting layer 27.

Commonly, the liquid crystal has the transmittance properties that depend on the wavelength. In the case in which the layer thickness of the liquid crystal is designed so that the transmittance is the minimum near a wavelength of 550 nm, which is almost the center wavelength of visible light, the phase to be imparted to light at a wavelength different from the phase of light at the center wavelength in design has errors from the ideal value. Thus, as shown by the broken line 701, the transmittance of light transmitted through the dimmer 20 (only provided with the liquid crystal layers) has the properties that depend on the wavelength. The transmittances on the long wavelength side (red) and the short wavelength side (blue) are great. When the user is observing a white object, the user sees the object in color mixed with blue and red.

Therefore, the transmittance adjusting layer 27 is provided with the transmittance properties (the solid line 700) inverted to the broken line 701. Thus, the wavelength dependence of external light to be transmitted through the dimmer 20, to which the transmittance adjusting layer 27 is adapted, becomes flat as shown by the alternate long and short dash line 702, allowing the influence of wavelength dependence to be eliminated.

As described above, according to the configuration of the second embodiment, two or more of the liquid crystal layers, which are light control layers, are alternately operated. Thus, burn-in, which occurs in the liquid crystal layers, can be easily prevented. The transmittance adjusting layer is additionally provided. Thus, the effect is obtained, in which the wavelength dependence of external light to be transmitted through the liquid crystal layer is eliminated.

Third Embodiment

In a third embodiment, the case will be described in which suspended particle devices are used for the light control layer of a dimmer.

Figure 9:
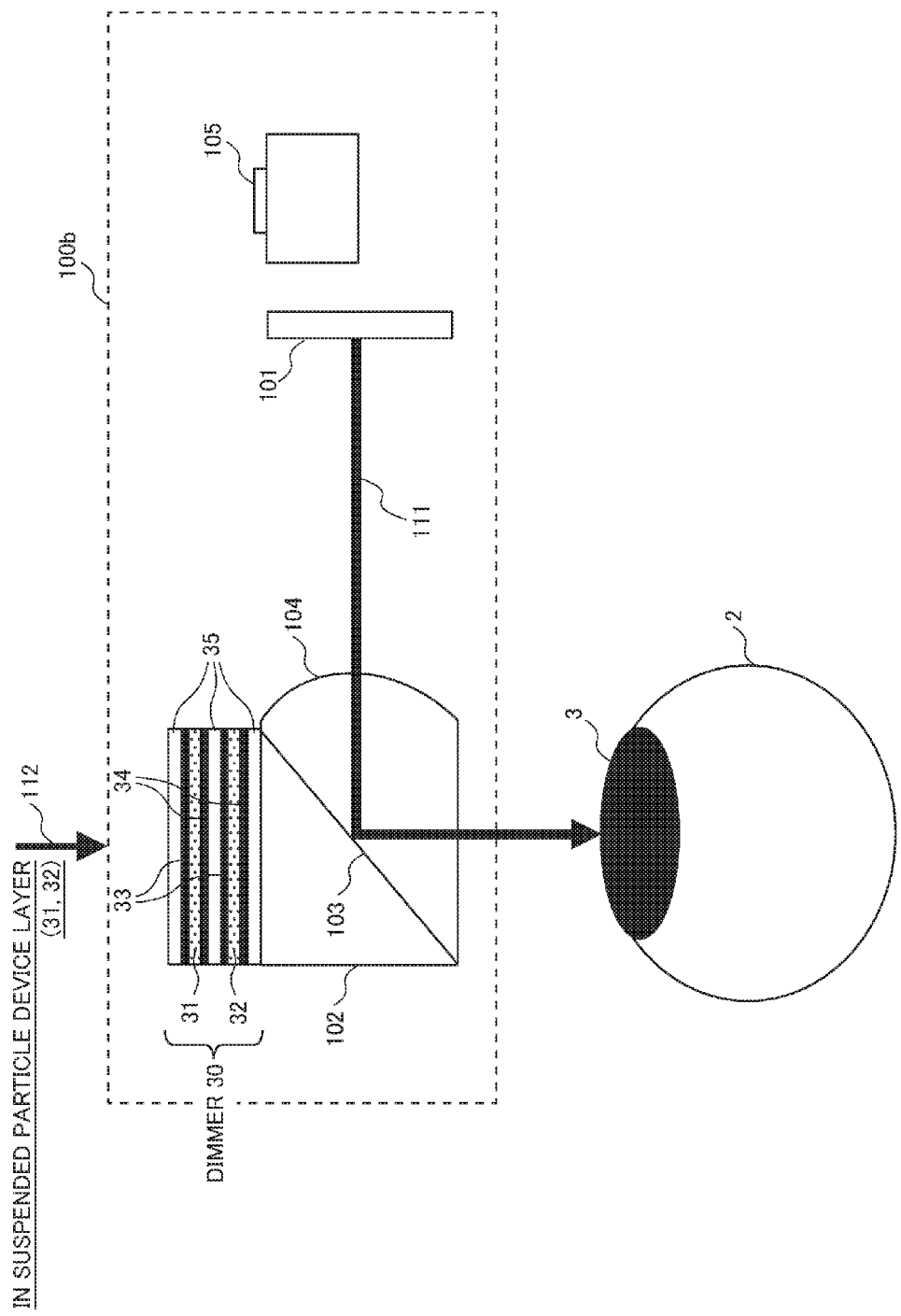
FIG. 9 is a top view of the configuration of a video display device using suspended particle device layers in a dimmer (a third embodiment)

FIG. 9 is a top view of the configuration of a video display device using suspended particle devices for a dimmer. Components having functions the same as the functions in the first embodiment (FIG. 1) are designated the same reference numerals and signs, and the description is omitted. In a video display device 100b, a dimmer 30 is configured using two suspended particle device layers, a first suspended particle device layer 31 and a second suspended particle device layer 32, electrodes 33 and 34 for them, and a transparent substrate 35. These are stacked, from the incident side of external light 112, in order of the transparent substrate 35, the positive transparent electrode 33, the first suspended particle device layer 31, the negative transparent electrode 34, the transparent substrate 35, the positive transparent electrode 33, the second suspended particle device layer 32, the negative transparent electrode 34, and the transparent substrate 35.

When ac voltages are applied to the suspended particle device layers 31 and 32 from the electrodes 33 and 34, alignment particles are aligned in parallel with the electric field. Thus, incident light travels straight ahead, and the dimmer 30 is transparent to the light. In the case in which no voltage is applied, alignment particles are randomly aligned, the incident light is absorbed to the alignment particles or irregularly reflected off the alignment particles, and the dimmer 30 is opaque to the light. As described above, the voltages to be applied to the suspended particle device layers 31 and 32 are changed, and hence the transmittance of the dimmer 30 can be adjusted. Next, the effect of using two suspended particle device layers 31 and 32 as the light control layers will be described.

Figure 10:
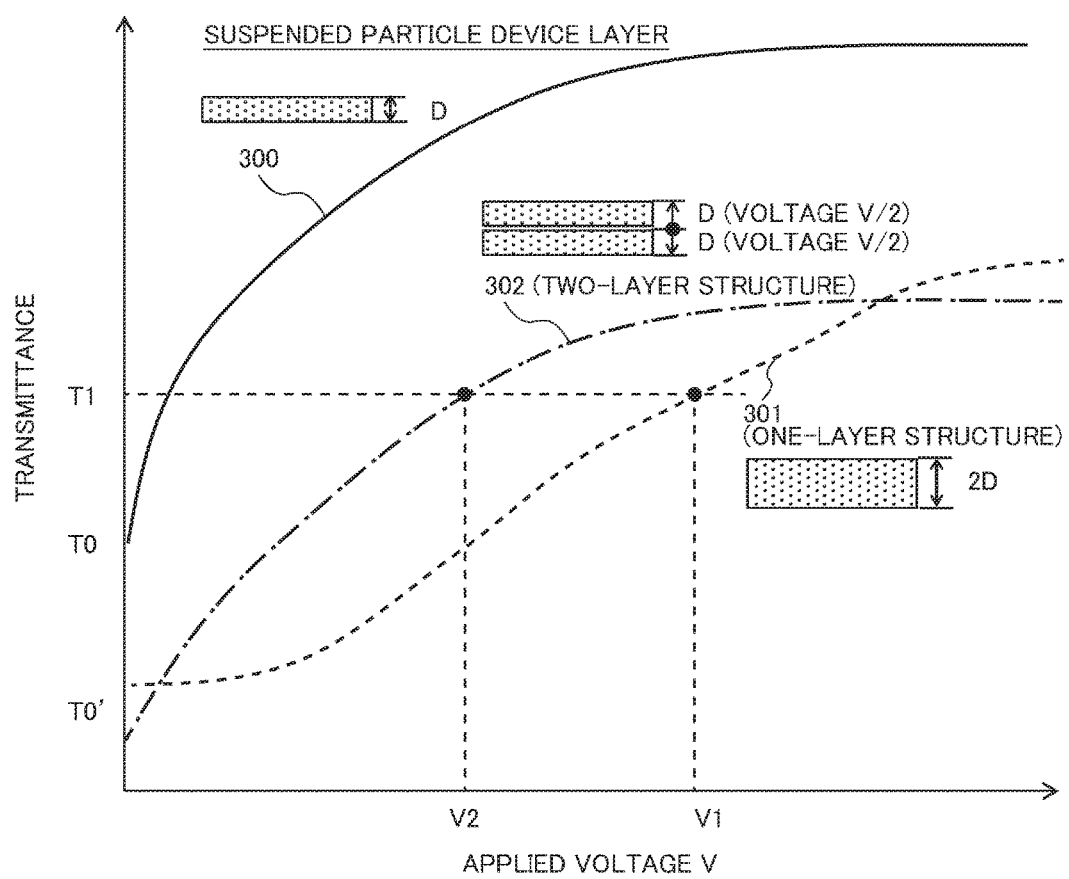
FIG. 10 is a diagram of the relationship between the transmittance of the suspended particle device layer and the applied voltage.

FIG. 10 is a diagram of the relationship between the transmittance of the suspended particle device layers and the applied voltage. A solid line 300 shows the case in which a suspended particle device layer has a thickness D. A broken line 301 shows the case in which a suspended particle device layer has a doubled thickness 2D. An alternate long and short dash line 302 shows the case in which two suspended particle device layers each have a thickness D.

As shown by the solid line 300, when an applied voltage V is increased, the transmittance of the suspended particle device layer (in the thickness D) is increased. However, even though the voltage V is zero, the transmittance is not zero, and a remaining value T0 is included. In the case in which the thickness is doubled to the thickness 2D in a one-layer structure, as shown by the broken line 301, the transmittance is decreased overall, and a remaining value T0' is also decreased at the voltage V=0. In other words, the light shielding properties are enhanced. However, the gradient of the transmittance to the applied voltage V is gentle. Thus, in order to obtain a high transmittance, a higher voltage V has to be applied.

On the other hand, in the case in which a two-layer structure is provided in the thickness D, as shown by the alternate long and short dash line 302, the gradient of the transmittance to the voltage is steep. In other words, enhanced transmittance properties can be obtained with a voltage lower than the voltage in the one-layer structure shown by the broken line 301. For example, the voltage for obtaining a transmittance T1 needs a voltage V1 in the one-layer structure. However, in the two-layer structure, the voltage is decreased to a voltage V2.

Commonly, in the case in which it is desired to obtain high light shielding properties (a low transmittance) using the suspended particle device layer, it is necessary to increase the thickness of the suspended particle device layer. In contrast, in the case in which it is desired to obtain a high transmittance, it is necessary to increase the applied voltage. However, applicable voltages are limited in wearable devices, such as a head mounted display. It is difficult to cover a desired range of the transmittance.

On the other hand, in the embodiment, the thickness of the suspended particle device layer is limited to a certain value, and two suspended particle device layers are provided. Thus, a desired transmittance range can be covered with a low applied voltage. Here, the configuration is described in which the dimmer 30 includes two suspended particle device layers. However, it is without saying that even a multi-layer configuration of three or more layers also provides a similar effect.

Figure 11A:
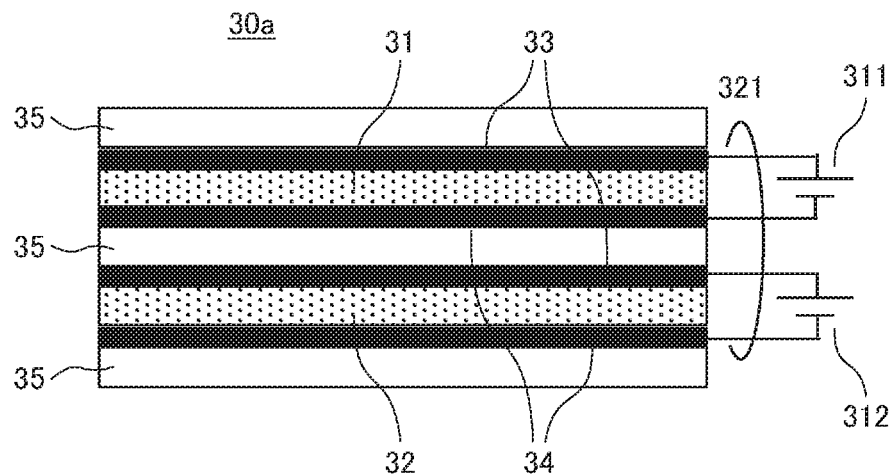
FIG. 11A is a diagram of an exemplary disposition of an electrode and a power supply that apply a voltage to the suspended particle device layers (double power supply drive)
Figure 11B:
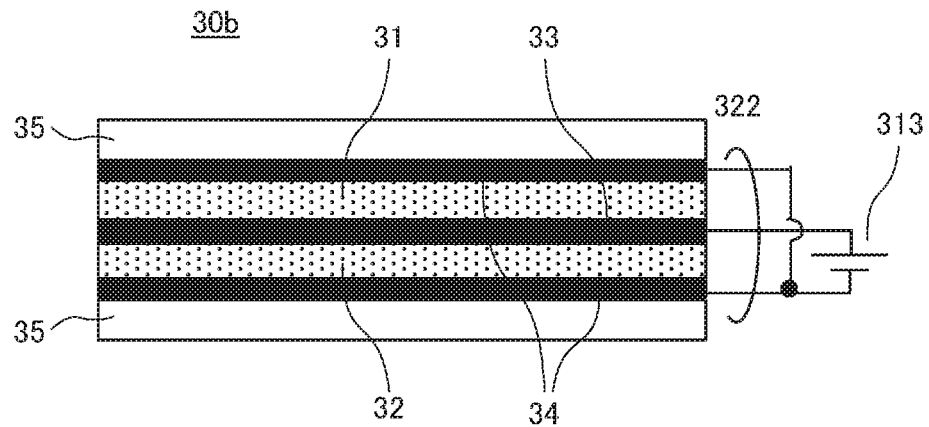
FIG. 11B is a diagram of an exemplary disposition of an electrode and a power supply that apply a voltage to the suspended particle device layers (single power supply drive)

FIGS. 11A and 11B are diagrams each showing an exemplary disposition of an electrode and a power supply that apply a voltage to the suspended particle device layers. FIG. 11A shows a double power supply driving method. FIG. 11B shows a single power supply driving method.

FIG. 11A shows a dimmer 30a in double power supply drive. The dimmer 30a has a structure the same as the structure of the dimmer 30 in FIG. 9, including a stack of a transparent substrate 35, a positive transparent electrode 33, a first suspended particle device layer 31, a negative transparent electrode 34, a transparent substrate 35, a positive transparent electrode 33, a second suspended particle device layer 32, a negative transparent electrode 34, and a transparent substrate 35 in this order. In order to operate two suspended particle device layers 31 and 32, two power supplies 311 and 312 and four wires 321 are necessary.

FIG. 11B shows an example of a dimmer 30b in single power supply drive. The structure has a stack of a transparent substrate 35, a negative transparent electrode 34, a first suspended particle device layer 31, a positive transparent electrode 33, a second suspended particle device layer 32, a negative transparent electrode 34, and a transparent substrate 35 in this order. In this case, electrodes provided between the first suspended particle device layer 31 and the second suspended particle device layer 32 adjacent to each other are shared to be one positive transparent electrode 33, eliminating the transparent substrate 35 in the middle. In order to operate two suspended particle device layers 31 and 32, one power supply 313 and three wires 322 only have to be disposed. Thus, this allows a reduction in the numbers of the power supplies and the wires. The transparent substrate in the middle is eliminated, and hence the effect of reducing the thickness can be obtained as well.

As described above, according to the third embodiment, two or more of the suspended particle device layers, which are the light control layers, are provided to form a multi-layer structure. Thus, a desired transmittance range can be covered in a feasible range of the applied voltage. In forming a multi-layer structure, a drive power supply and wires can be shared.

Fourth Embodiment

In a fourth embodiment, in the case will be described in which electrochromic layers are used for the light control layer of a dimmer.

FIG. 12 is a top view of the configuration of a video display device using electrochromic layers for a dimmer. Components having functions the same as the functions in the first embodiment (FIG. 1) are designated the same reference numerals and signs, and the description is omitted. In a video display device 100c, a dimmer 40 is configured using a first electrochromic layer 41, a second electrochromic layer 42, a positive transparent electrode 43 and a negative transparent electrode 44 for them, and a transparent substrate 45. These are stacked, from the incident side of external light 112, in order of the transparent substrate 45, the positive transparent electrode 43, the first electrochromic layer 41, the negative transparent electrode 44, the transparent substrate 45, the positive transparent electrode 43, the second electrochromic layer 42, the negative transparent electrode 44, and the transparent substrate 45.

The electrochromic layers 41 and 42 are devices that develop and reduce colors due to oxidation-reduction reactions caused by giving and receiving electric charge with the application of a positive or negative voltage from the electrodes 43 and 44. In other words, the voltages to be applied to the electrochromic layers 41 and 42 are changed. Thus, the transmittance of the dimmer 40 can be adjusted. Next, the effect of using two electrochromic layers 41 and 42 as the light control layers will be described.

Figure 13:
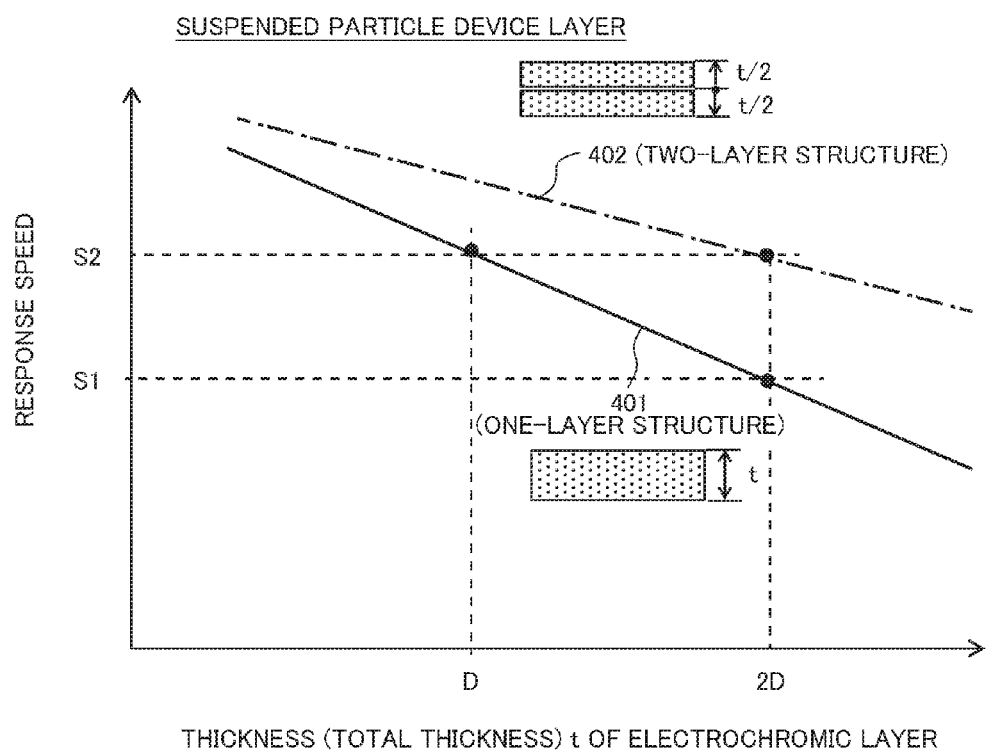
FIG. 13 is a diagram of the relationship between the response speed and the thickness of the electrochromic layer.

FIG. 13 is a diagram of the relationship between the response speed and the thickness of the electrochromic layers. A solid line 401 shows an electrochromic layer in a one-layer structure (in a thickness t). An alternate long and short dash line 402 shows electrochromic layers in a two-layer structure (two layers each in a thickness t/2). The lines 401 and 402 show a change in the response speed to the total thickness t.

As shown by the solid line 401, the response speed is slower, as the electrochromic layer is thicker. In contrast, in order to obtain a predetermined transmittance range, it is necessary to use an electrochromic layer in a thickness t equal to or greater than a predetermined thickness. Thus, it is difficult that the transmittance is compatible with the response speed, which are necessary for wearable devices, such as a head mounted display, using an electrochromic layer in a one-layer structure. In the embodiment, a two-layer structure is provided, allowing the transmittance to be compatible with the response speed. For example, when the total thickness t=2D for obtaining a desired transmittance, the response speed is defined as S1 in the one-layer structure. The two-layer structure having two layers each in a thickness D is formed, and hence the response speed is improved to a response speed of S2 in the thickness D.

Similarly to the effect of the third embodiment described with reference to FIGS. 11A and 11B, also in the embodiment, the electrodes to apply voltages are shared in the multi-layer configuration, and the numbers of power supplies and wires can be reduced. Here, the configuration is described in which the dimmer 40 includes two electrochromic layers. However, it is without saying that even a multi-layer configuration of three or more layers also provides a similar effect.

As described above, according to the fourth embodiment, two or more of the suspended particle device layers, which are the light control layers, are provided to form a multi-layer structure. Thus, the effect is provided, in which the response speed is improved with the transmittance being maintained.

Fifth Embodiment

In a fifth embodiment, a configuration will be described, in which regions to control light are switched in the field of view of the user. In the first to the fourth embodiments, light is controlled in the entire field of view. Here, light is controllable only in a part of the field of view.

FIG. 14 is a top view of the configuration of a video display device that can control light only in a part of the field of view. A video display device 100d is different from the video display device 100 of the first embodiment (FIG. 1) in that the configurations of a video projector 102b and a dimmer 50 are different. The video display device 100d is configured of a video generator 101, the video projector 102b, the dimmer 50 including a first light control region 51 and a second light control region 52, and an external light detector 105. The user wears the video display device 100d like spectacles so as to cover the entire field of view of the user.

Picture light 111 emitted from the video generator 101 is entered to the video projector 102b. The video projector 102b includes two reflective films 103b and 103c. The picture light 111 is reflected off the reflective films 103b and 103c, and entered to the pupil 3 of the user. The picture light 111 travels between the reflective films 103b and 103c in total reflection on the side surface of the video projector 102b.

The dimmer 50 is disposed on the opposite side of the video projector 102b when viewed from the user's eye 2. The dimmer 50 is configured in which the first light control layer 11 and the second light control layer 12 are stacked in the incident direction of the external light 112 and the incidence plane of the external light 112 is split into a first light control region 51 and a second light control region 52. For example, the first light control region 51 corresponds to a region in which the picture light 111 is entered to the pupil 3 of the user (i.e. a picture display region). The second light control region 52 corresponds to a region on the outer side of the region in which the picture light 111 is entered (i.e. a region on the outer side of the picture display region). The light controller 107 in FIG. 2 separately controls light in the first light control region 51 and the second light control region 52.

Figure 15A:
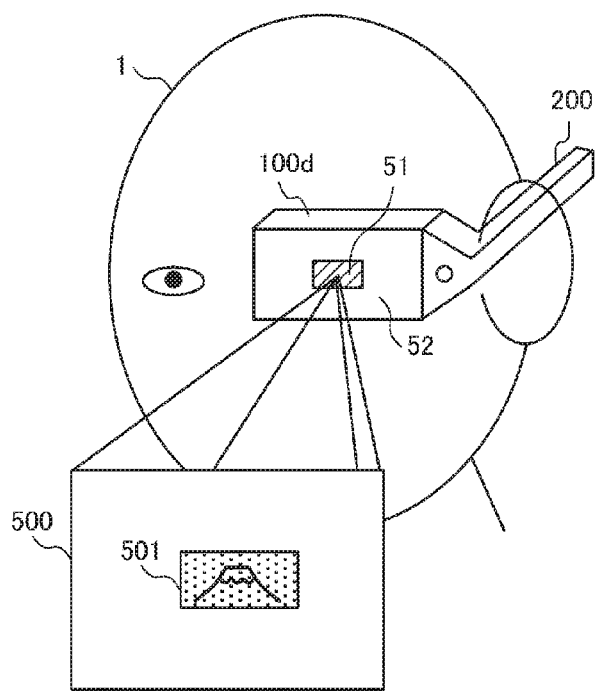
FIG. 15A is a diagram of the field of view of a user through a head mounted display.
Figure 15B:
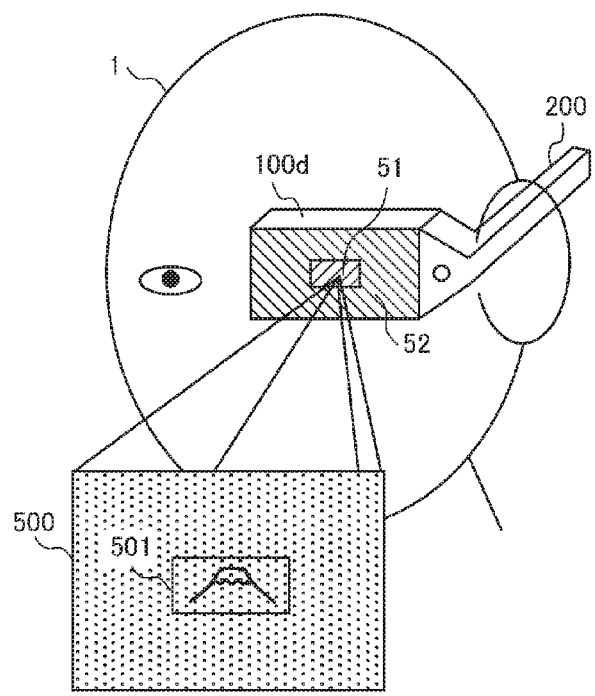
FIG. 15B is a diagram of the field of view of a user through a head mounted display.

FIGS. 15A and 15B are diagrams each showing the field of view of the user through the head mounted display 200 installed with the video display device 100d. FIG. 15A is the case in which light is controlled only in the first light control region 51. FIG. 15B is the case in which light is controlled both in the first light control region 51 and the second light control region 52. A user 1 switches between the fields of view in FIGS. 15A and 15B using the manipulator 207 in FIG. 5 of the head mounted display 200.

In the case of FIG. 15A, in a region 500 of the entire field of view, the transmittance is adjusted only in the picture display area 501 for the user 1. Thus, the contrast of pictures can be improved with the field of view of the surroundings being maintained brightly. In contrast, in the case of FIG. 15B, the transmittance is adjusted in the region 500 of the entire field of view. Thus, the contrast of pictures can be improved with the luminosity of the surroundings being adjusted. Of course, it may be also possible in the case of FIG. 15B, in which light is adjusted with different transmittances in the first light control region 51 and the second light control region 52.

As described above, according to the fifth embodiment, the region in which light is controlled is split and light is separately controlled in the split regions. Thus, switching is made possible between the improvement of only the contrast of pictures suitable for the use situations and the adjustment of the entire luminosity like sunglasses. Note that, it is without saying that the numbers of split shapes and splitting the light control region can be appropriately changed suitable for applications.

In the first to the fifth embodiments described above, the case is taken as an example and described in which the dimmer and the video display device are applied to the head mounted display 200. However, the applications of the dimmer and the video display device are not limited to this. For example, the dimmer and the video display device are also applicable to a head-up display as below.

Figure 16:
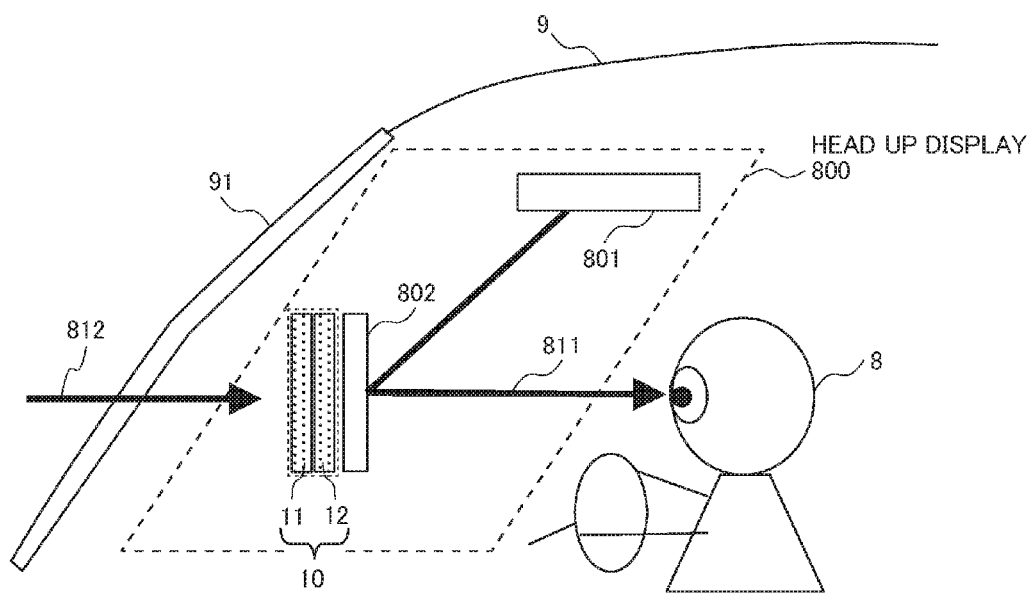
FIG. 16 is a schematic diagram of an example in which a dimmer is applied to a head-up display.

FIG. 16 is a schematic diagram of an example in which the dimmer is applied to a head-up display. A head-up display 800 is configured of a video generator 801, a combiner 802, and the dimmer 10. The dimmer 10 is configured of the first and the second light control layers 11 and 12, to which the optical devices described in the embodiments can be adopted.

The video generator 801 is disposed in the inside of a vehicle 9 so as not to be an obstacle to the field of view of a driver 8. Picture light 811 emitted from the video generator 801 is reflected off the combiner 802, and reached to the eyes of the driver 8. The driver 8 recognizes the picture light 811 generated on the screen in the inside of the head-up display 800 as a virtual image located in the front area of the driver 8. In the combiner 802, the dimmer 10 is disposed on the opposite side when viewed from the driver 8. Thus, the luminosity of external light 812 emitted from the front area of the vehicle 9 is adjusted.

As described above, also in the head-up display 800, the dimmer 10 is used to adjust the external light 812.

Thus, the contrast of pictures to external light can be improved. In doing so, the dimmer 10 is formed in a two-layer structure, allowing practical performance to be improved as described in the embodiments. In this example, the structure is provided in which the dimmer 10 is attached to the combiner 802. However, a structure is fine in which the dimmer 10 is attached to an automobile windshield 91.

In the applications to the other fields, the dimmer according to the present invention is also applicable to a substitution of a curtain of buildings, airplanes, vehicles, and others, and also applicable to the field of digital signage.

What is claimed is:

1. A head mounted display comprising:
  a video display device that displays pictures in a field of view of a user, the video display device comprising:
    a video generator that generates picture light;
    a video projector that projects the picture light generated at the video generator in the field of view of the user as a virtual image;
    a dimmer disposed on an opposite side of the video projector to project the picture light to the user through the video projector, the dimmer adjusting a light quantity of external light to be entered to a user's eye;
    an external light detector that detects luminosity of the external light; and
    a light controller that controls the dimmer suitable for the luminosity of the external light detected at the external light detector,
    wherein the dimmer has a configuration in which two or more light control layers are stacked in an incident direction of the external light, each of the light control layers changes a transmittance of light at wavelengths in a visible light region by controlling a voltage applied to the light control layers,
  an arm installed with the video display device, the arm being worn on a head of a user;
  a power supply that supplies power to the video display device;
  a storage device that records information;
  a sensor that detects a position or attitude of the user;
  a communication device that communicates with an external device;
  a speech processor that processes speech through a microphone or earphones;
  a manipulator that receives a user manipulation; and
  a controller that controls the head mounted display overall.

2. A video display device that displays pictures in a field of view of a user, the video display device comprising:
  a video generator that generates picture light;
  a video projector that projects the picture light generated at the video generator in the field of view of the user as a virtual image;
  a dimmer disposed on an opposite side of the video projector to project the picture light to the user through the video projector, the dimmer adjusting a light quantity of external light to be entered to a user's eye;
  an external light detector that detects luminosity of the external light; and
  a light controller that controls the dimmer suitable for the luminosity of the external light detected at the external light detector,
  wherein the dimmer has a configuration in which two or more light control layers are stacked in an incident direction of the external light, each of the light control layers changes a transmittance of light at wavelengths in a visible light region by controlling a voltage applied to the light control layers, and
  wherein each of the light control layers is a liquid crystal layer in which a phase imparted to incident light is changed by alternately applying the voltage to each of the light control layers.

* * * * *